H. R. TERRY.
Bee Hive.
No. 33,668.
Patented Nov. 5, 1861.
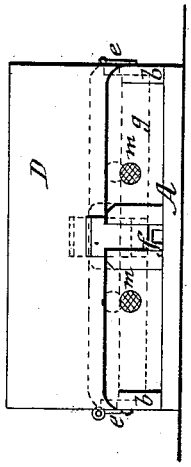
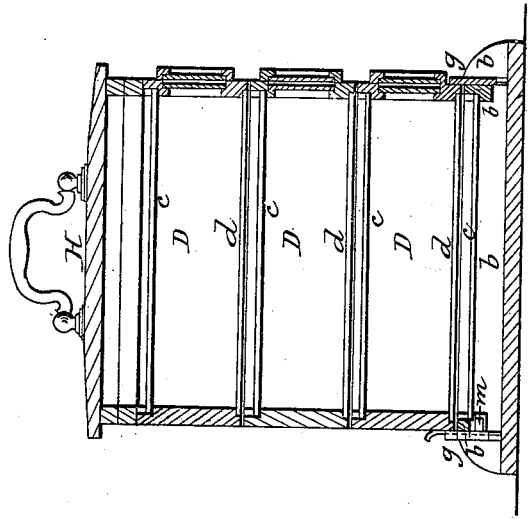
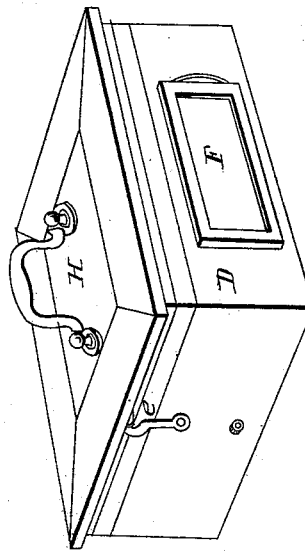
Witnesses.
Sidney Geo. Gwynne C.b.
S. A. Allis
Inventor.
Henry R. Terry,
By his Attorney J. Fraser.

UNITED STATES PATENT OFFICE.

HENRY R. TERRY, OF EDINBOROUGH, PENNSYLVANIA.

IMPROVEMENT IN BEE-HIVES.

Specification forming part of Letters Patent No. 33,668, dated November 5, 1861.

*To all whom it may concern:*

Be it known that I, HENRY R. TERRY, of Edinborough, in the county of Erie and State of Pennsylvania, have invented a new and Improved Mode of Constructing Bee-Hives; and I do hereby declare that the following is a full and exact description thereof, reference being had to the accompanying drawings, making part of this specification, in which—

Figure 1 is a vertical section of my improved hive. Fig. 2 is a perspective view showing the top and one of the sections removed. Fig. 3 is an elevation of the lower part of the hive, showing the front slide-gate $g$, its position when raised being indicated by dotted lines.

Like letters designate corresponding parts in all of the figures.

My improvement consists in constructing the hive in horizontal sections, fitted to a suitable base and provided with a top, which forms a roof or cover, each section being separated from the others by series of slats, and connected together when in use by hooks or other equivalent fastenings, which admit of the ready detachment and removal of any one of them.

As represented in the drawings, A is the base or bottom of the hive, consisting of a piece of plank or board of the proper dimensions, with strips $b\ b$ around the sides, which rise an inch, or thereabout, above the surface of the bottom. A series of slats $c\ c$ is fixed across the area thus formed, leaving a space below which receives the refuse matter, which is removed, as will be hereinafter explained. On this base the sections D D are placed, one above the other, and all of a size corresponding with each other and with the base. Each one is provided with a series of slats $c$ at or near its upper surface, and a like series $d$ on its lower surface. These lie in the same direction, and the lower series of one section is so close to the upper series of the other that it precludes the building of comb between to interfere with their separation, but allows the free passage of the working bees. The sections are three or four inches in depth, which permits the formation of combs, which are suspended from the upper series of slats. Each section is provided with a glass light F, covered with a slide to admit of the inspection of the bees while at work. These sections being readily removable, any one of them may, when filled with new honey, be changed for an empty section, thus taking the place of honey-boxes, and any number may be added to increase the capacity of the hive and adapt it to the size of the swarm. By this means the troublesome method of transferring the bees from a smaller to a larger hive, and vice versa, is entirely dispensed with and much time and labor saved. As a separation may instantly be made at any of the divisions by simply disconnecting the hooks $e\ e$, it affords the greatest facility for removing worms, moths, and all extraneous matter that may reach the interior of the hive. The top H should have a slight projection sufficient to prevent drops of water from running down the side of the hive and entering at the joints between the sections, and a handle placed in the center enables the entire hive to be lifted and handled with ease.

A horizontal gate or slide $g$ is provided both at the back and front sides of the hive. Its ends are secured in grooves in the strips $b\ b$, and when both are raised at the same time the whole extent of the bottom of the hive is exposed, so that the surface may be cleansed with ease by brushing or scraping out the refuse, which falls from above. This arrangement also admits of the unobstructed passage of air through the whole area of the hive, tending to remove noxious vapors and keep the atmosphere pure within the hive. It also affords so great an extent of opening that the bees have more ready ingress and egress. Both slides may be graduated so as to admit more or less air, and when the space is so diminished that the bees cannot pass the central orifice $f$ is used for that purpose.

When the rigor of the weather prevents the opening of the gate $g$, ventilation is effected by the orifices $m\ m$ in the front gate, which, when it is closed, coincide in position with ventilating-apertures $i\ i$, through the front strip $b$, which are covered with wire-cloth, and are only exposed when the gate is closed.

The series of the slats $c\ d$ not only effect the separation of the sections, but enable the bees to be fed in winter, when necessary, by placing their food in shallow pans directly underneath, so that they can, when torpid from the cold, feed without leaving the slats.

These improvements render this hive one of the cheapest to construct of any in use, while it possesses all the conveniences and advantages of the more complicated structures.

What I claim as my invention, and desire to secure by Letters Patent, is—

The depression of the horizontal slats on the top of the sections, whereby a lateral passage is formed for the bees through the section of comb.

In witness whereof I have hereunto signed my name, in the presence of two subscribing witnesses, this 28th day of September, A. D. 1861.

HENRY R. TERRY.

Witnesses:
    JOHN M. SHERROD,
    JOHN W. CAMPBELL.